W. M. SELKIRK.
MANDREL MANIPULATOR.
APPLICATION FILED JAN. 30, 1917.

1,254,441.

Patented Jan. 22, 1918.
2 SHEETS—SHEET 1.

INVENTOR
William M. Selkirk

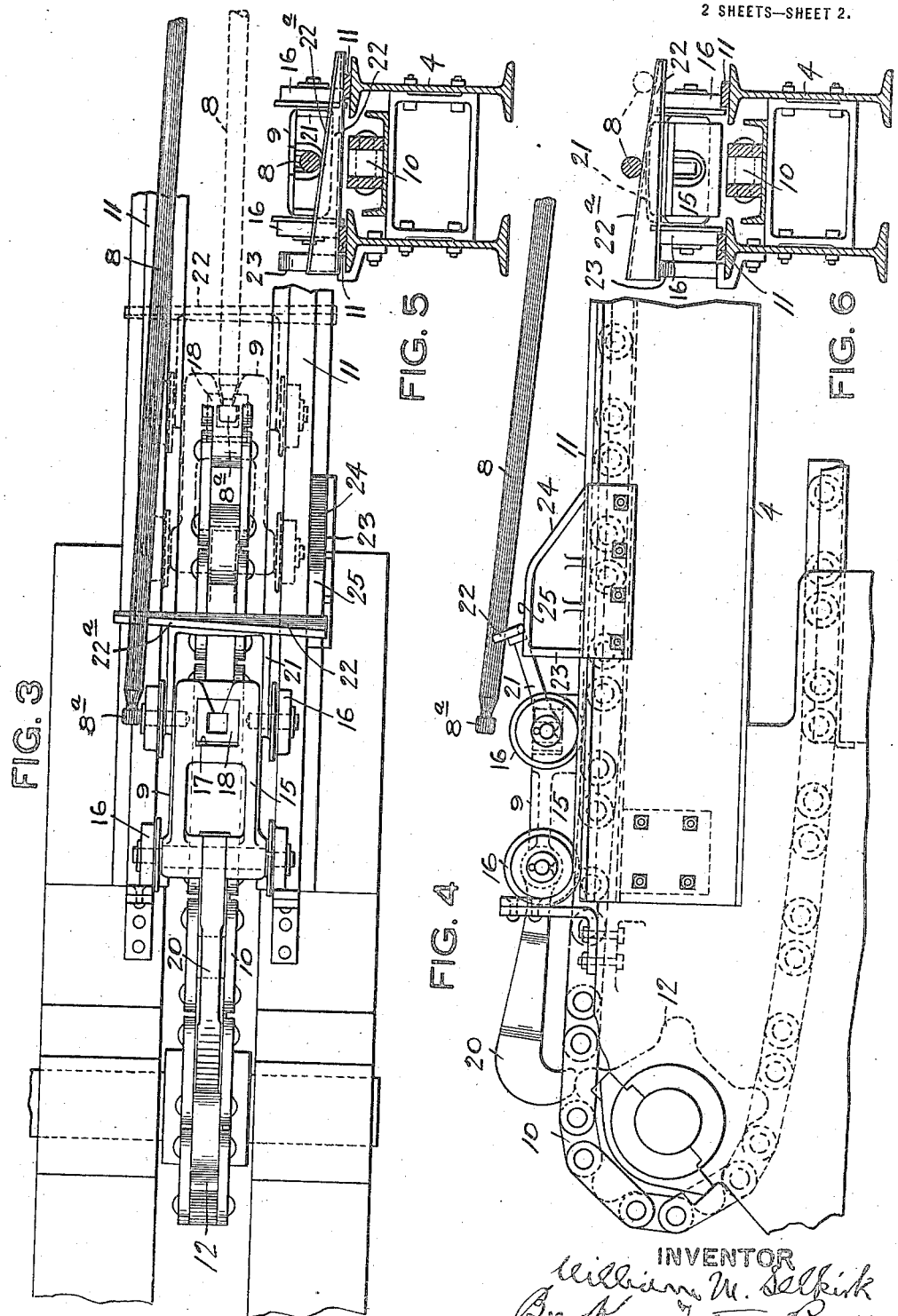

UNITED STATES PATENT OFFICE.

WILLIAM M. SELKIRK, OF NORTH BELLE VERNON, PENNSYLVANIA, ASSIGNOR TO PITTSBURGH STEEL PRODUCTS COMPANY, OF PITTSBURGH, PENNSYLVANIA, A CORPORATION OF PENNSYLVANIA.

MANDREL-MANIPULATOR.

1,254,441.      Specification of Letters Patent.      Patented Jan. 22, 1918.

Application filed January 30, 1917. Serial No. 145,427.

*To all whom it may concern:*

Be it known that I, WILLIAM M. SELKIRK, a citizen of the United States, and resident of North Belle Vernon, in the county of Fayette and State of Pennsylvania, have invented a new and useful Improvement in Mandrel-Manipulators; and I do hereby declare the following to be a full, clear, and exact description thereof.

My invention relates to tube-making apparatus, and more specifically to apparatus for stripping the mandrel from the tube and manipulating the mandrel after withdrawal.

Heretofore in the manufacture of tubing, particularly seamless tubes, when rolled or drawn on a mandrel, the operation of removing the mandrel from the draw-gripping device and from the draw bench after withdrawal of the mandrel from the tube involved considerable labor. The mandrels commonly are long and heavy, and generally, at least two workmen are required to perform these operations, and further, by reason of the "hand" operations, occasional loss occurs through failure to promptly release the mandrel from the draw head and remove it from the bench, so as to return the draw device to position in time to engage the next mandrel as it is delivered with the tube from the rolls.

It is necessary in tube manufacture that these operations are performed regularly, and in time with the regular recurring mechanical operations of the mill, and the present invention aims to obviate the difficulties of hand operation by providing apparatus which performs part of these operations mechanically, and in such manner as to greatly reduce the labor cost and at the same time provide for more rapid operation of the mill.

The invention consists in the novel construction, combination and arrangement of parts hereinafter described.

Figure 1:
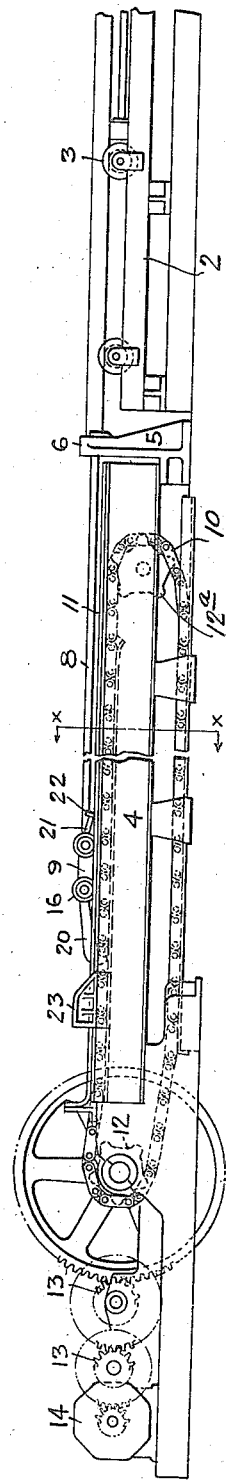
Figure 2:
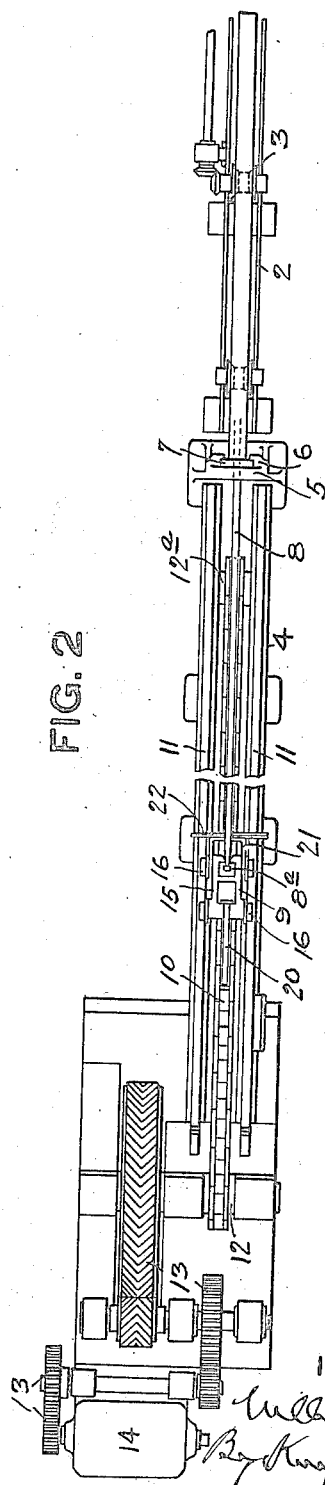

In the drawings, Figure 1 is a side elevational view of a suitable bench and a portion of the tube-conveying table with my invention applied thereto; Fig. 2 is a plan view of Fig. 1; Figs. 3 and 4 are enlarged plan and side elevation, respectively, of a portion of the draw-bench with the draw buggy and means for ejecting the mandrel from the jaws of the buggy; Fig. 5 is a cross-sectional view taken at $x$—$x$, Fig. 3, and shows the position of the ejecting means in relation to the mandrel during the extracting of the mandrel from the tube; and Fig. 6 is a like view showing the position of parts when the mandrel is ejected from the draw buggy.

The numeral 2 indicates the end portion of a conveyer table for conveying the tube with the mandrel from the rolls to the mandrel extractor. The table is provided with the usual power driven conveying rolls 3 upon which the tube is supported. Near the end of the table and in line with it, is located the extractor, indicated generally as at 4. An abutment is located between the extractor and the conveying table, and comprises a housing 5 preferably connected to or made part of the extractor; the housing has a jaw or recessed head 6 for the reception of a removable stripper plate or "stopplate" 7 against which the end of the tube abuts. The mandrel 8 as it comes with the tube from the rolls projects beyond the tube and through an opening in the plate 7, and has a head $8^a$ adapted to be engaged by a draw device of the extractor for pulling the mandrel out of the tube as the tube abuts against the stripper plate of the fixed abutment. All of the above described apparatus is of the usual arrangement and does not need to be described further for those skilled in the art.

The extractor bench in the instance shown is also partly typical with such apparatus as to the general arrangement thereof. The bench comprises a structure built up of beams or castings to form a track and guide for the traveling draw-head or buggy 9. A sprocket chain 10 arranged between the tracks 11 on sprocket wheels 12—$12^a$ provides the means for moving the buggy. The front sprocket or the one farthest away from the abutment is positively driven by powerful gear connections 13 with a power element, such as the motor 14.

The draw-head or buggy in the present invention is devised in such manner, and operates with connections of the bench as to automatically eject the mandrel from the draw-buggy at completion of the draw, or when the mandrel leaves the tube; also the mandrel is partly removed from the bench and is moved into such position as to enable a single workman to entirely remove the mandrel with little labor. After the mandrel is ejected, the draw-buggy automatically stops and remains in this position until moved back to engage another mandrel.

The draw-buggy has the body portion 15 mounted on wheels 16 which support the buggy and guide it on the track central with the chain. The body is shown as a single member such as a casting, and has the recess or socket 17 formed centrally of the body for the reception of a socket jaw 18 adapted for engagement with the mandrel head. The socket jaw is freely removable, so as to be exchangable in case of wear, and exchangable for other sizes of jaws for different mandrels for which the apparatus is adapted.

The buggy is connected to the draw chain in the usual manner, namely, a hook 20 is pivoted to the front of the buggy to permit movement of the free end of the hook downward to engage the chain for pulling the buggy to extract the mandrel, and upward movement of the hook when the hook is thrown out of engagement by contact with the driving sprocket teeth at completion of the travel of the buggy.

The ejector for ejecting the mandrel from the buggy jaw at completion of the draw, comprises a yoke 21, journaled to the rear axles of the buggy and having an ejecting arm 22 adapted to lie beneath the mandrel for ejecting the mandrel upward. Preferably, the arm is arranged transversely of the buggy and of the bench to extend beyond the tracks 11, and is adapted to ride or bear on the tracks and out of contact with the mandrel during the extracting operation.

At one side of the bench and situated at a distance to permit the full withdrawal of the mandrel from the tube before ejection from the buggy, is the ejector shoe 23. This shoe is positioned to lie in the path of one end of the pivoted ejector arm, and has the inclined or elevating face 24, and a face 25 which is substantially parallel with the track surface. Face 24 is adapted to raise the ejector arm as the arm is drawn into engagement with the shoe by movement of the buggy after completion of the extracting operation, so as to force the mandrel head out of the jaws of the buggy, and to elevate the mandrel free of the buggy.

The upper face of the arm which engages the mandrel is inclined as at 22ª, and slopes downwardly toward that side of the bench to which the mandrel is discharged, the discharge end of the arm overhanging the bench. When the mandrel is elevated as above described, the degree of inclination of the arm is such as to cause the freed end of the mandrel to slide or roll away from the buggy. The face 25 of the shoe maintaining the arm elevated until the mandrel is entirely free of the arm, and when the buggy is reversed to engage another mandrel the ejector returns to its normal position.

In the operation of my invention, the mandrel is not wholly discharged from the bench automatically in the ejecting operation, as naturally the tube end of the mandrel will remain on the bench while the draw end is being ejected and elevated from the buggy, but the entire ejection of the mandrel is made an easy operation by the employment of the above described mechanism, as compared with the hand operation heretofore, as all that is necessary to effect the complete ejection of the mandrel is the placing of a bar or a rod beneath the inclined rolling or sliding mandrel near its tube end, to act as a skid upon which the moving mandrel may be easily guided and thrown from the bench. By reason of the motion given to the mandrel by the inclined ejector arm, the hand operation is greatly facilitated and is generally performed simultaneously with the ejecting operation.

It will be apparent without specific illustration, that modifications may be made to the structure without departing from the principle of my invention, as set forth in the claims. For instance, instead of pivoting the ejector around the axles of the buggy, it may be pivoted at any other place on the buggy which will permit operation, and the ejector arm may be supported independently of the bench or track, and I do not wish to limit my invention to the exact structure shown in the drawings.

What I claim is:

1. In a mandrel manipulator for rolled or drawn tubes, the combination of an extractor support, a reversibly-movable extractor adapted to travel on the support for extracting the mandrel, ejecting mechanism, and means carried by the support for operating the ejecting mechanism.

2. In a mandrel manipulator for rolled or drawn tubes, the combination of an extractor support, a mandrel extractor reversibly-movable on said support, power mechanism for actuating the extractor to extract the mandrel, ejecting mechanism, and connections between said support and said extractor for operating the ejecting mechanism.

3. In a mandrel manipulator for rolled or drawn tubes, the combination of an extractor bench, a draw buggy adapted to travel on the bench, means separate from the buggy for operating the buggy to extract the mandrel, ejecting mechanism, and means for operating the ejecting mechanism, co-operatively associated with said first means.

4. In a mandrel manipulator for rolled or drawn tubes, the combination of an extractor bench, a draw buggy adapted to be reciprocated on the bench, means for operating the buggy to extract the mandrel, an ejector supported on the buggy, and means for operating the ejector, coöperatively associated with said first means.

5. In a mandrel manipulator for rolled or drawn tubes, the combination of an extractor bench, a draw buggy adapted to be reciprocated on the bench, means for operating the buggy to extract the mandrel, an ejector supported on the buggy, and means on the bench for operating the ejector, coöperatively associated with said first means.

6. In a mandrel manipulator for rolled or drawn tubes, the combination of an extractor bench, a draw buggy adapted to travel on the bench, means for operating the buggy to extract the mandrel, an ejector supported on the buggy and adapted to elevate the mandrel and eject it sidewise of the buggy, and means for operating the ejector, controlled by said first means.

7. In a mandrel manipulator for rolled or drawn tubes, the combination of an extractor bench, a draw buggy adapted to travel on the bench, means for operating the buggy to extract the mandrel, an ejector supported on the buggy comprising an ejecting arm adapted to lie beneath the mandrel and having a downwardly inclined mandrel-engaging face, and means for elevating the ejector arm to eject the mandrel from the buggy.

8. In a mandrel manipulator for rolled or drawn tubes, the combination of an extractor bench, a draw buggy adapted to travel on the bench, means for operating the buggy to extract the mandrel, an ejector supported on the buggy comprising an ejecting arm adapted to lie beneath the mandrel and having a downwardly inclined mandrel-engaging face, and a shoe on the bench adapted to engage the ejector arm to elevate it.

In testimony whereof, I the said WILLIAM M. SELKIRK, have hereunto set my hand.

WILLIAM M. SELKIRK.

Witnesses:
  ROBT. D. TOTTEN,
  JOHN F. WILL.

Copies of this patent may be obtained for five cents each, by addressing the "Commissioner of Patents, Washington, D. C."